Patented Feb. 3, 1948

2,435,500

UNITED STATES PATENT OFFICE 2,435,500

2,3 - EPOXY-1,2,3,4-TETRAHYDRONAPHTHA-LENEDIONE-1,4 AS PARASITICIDAL PREPARATIONS

Elbert C. Ladd, Passaic, N. J., assignor to United States Rubber Company, New York, N. Y., a corporation of New Jersey No Drawing. Application August 5, 1944, Serial No. 548,299

17 Claims. (Cl. 167—30)

This invention relates to new and useful improvements in parasiticidal preparations, more particularly to germicides, that is, fungicides and bactericides. The invention further relates to methods of treating plants, and to methods of protecting organic material subject to attack by microorganisms, as the immunizing of seed, and the mildewproofing of fabrics and other material.

I have found that 2,3-epoxy-1,2,3,4-tetrahydronaphthalenedione-1,4 and the 2-methyl derivative thereof are effective fungicides and bactericides. The structure of the 2,3-epoxy-1,2,3,4-tetrahydronaphthalenedione-1,4 may be represented as follows:

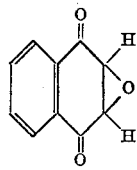

The compound and a method of preparation are described by Zincke in Berichte der Deutschen Chemischen Gesellschaft, vol. 25, page 3602 (1892). It is there called $\alpha,\alpha$-diketo-tetrahydronaphthalene oxide. The structure of the 2-methyl - 2,3 - epoxy - 1,2,3,4-tetrahydronaphthalenedione-1,4 may be represented as follows:

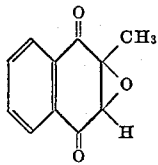

The compound and a method of preparation are described by Madinaveitia, Rev. Acad. Cienc. Madrid, 31, 617–47 (1934). It has also been described by Fieser et al., J. Am. Chem. Soc., 61, 3219 (1939).

The 2,3-epoxy-1,2,3,4-tetrahydronaphthalenedione-1,4 and its 2-methyl derivative may be used as seed protectants and to protect plants, which term includes plant parts, or soil from microorganisms harmful to seeds and plants. They may also be applied to prevent or retard fungus growth and the formation of, for example, mildew on organic material such as rope, wood, fur, hair, feathers, cotton, wool, leather, paints, varnishes and the like. The 2,3-epoxy-1,2,3,4-tetrahydronaphthalenedione-1,4 or its 2-methyl derivative may be applied as a dust, undiluted or mixed with a solid carrier such as clay or talc, or as a spray in a liquid carrier, as in solution in a suitable solvent, or suspended in a suitable non-solvent medium, for example, water. They may be used admixed with carriers that are active of themselves, for example, other fungicides or bactericides, or insecticides, insect repellents, fertilizers, hormones, buffering or safening agents.

The following examples are given to illustrate the invention:

Example I

Pea seed, variety Perfection, were tumbled with .125% by weight of 2,3-epoxy-1,2,3,4-tetrahydronaphthalenedione-1,4 in dust form. The seeds were then planted in soil known to be infested with a number of organisms, including Pythium ultimum. The effectiveness of the chemical as a fungicide was determined by comparing the number of treated and untreated seeds which germinated into healthy plants from equal numbers of treated and untreated seeds planted under the same conditions. Observations made at the end of ten days showed that 83% of the treated seeds had germinated and grown into healthy seedlings, whereas only 27% of the untreated seeds germinated and grew.

Example II

Two tomato plants with four to six fully expanded leaves were sprayed for 20 seconds at 20 lbs. per sq. in. pressure with an aqueous suspension (prepared with a small amount of commercial dispersing agent) of 2000 parts per million of 2,3-epoxy-1,2,3,4-tetrahydronaphthalenedione-1,4. After drying overnight in the greenhouse, the two treated plants, together with four untreated (check) plants were sprayed for 20 seconds at 20 lbs. per sq. in. pressure with an aqueous suspension of spores of Alternaria solani containing approximately 37,000 spores per cubic centimeter. The plants were then set in an incubation chamber at 75° F. and 100% humidity for 24 hours. The plants were then removed to the greenhouse and held on the greenhouse bench for ten days. The number of lesions were counted on the leaves of the plants. There were 10 and 15 lesions, respectively, on the two plants treated with the chemical and 80, 105, 110 and 149 lesions, respectively, on the check plants not treated with the chemical, averaging 89% control.

Example III

In slide tests made on spores of the fungus Sclerotinia fructicola, using the "slide technique" described by S. E. A. McCullan et al., Contributions Boyce-Thompson Institute 4, 233 (1932); 9, 249 (1938); 10, 329 (1939); 12, 49 (1941); 12, 431 (1943), five parts of 2,3-epoxy-1,2,3,4-tetrahydronaphthalenedione-1,4 per million parts of water gave 100% kill of the fungus. When applied to plants as an aqueous suspension, it may safely and effectively be applied in concentrations up to 0.3%.

*Example IV*

This case illustrates the effectiveness of 2,3-epoxy-1,2,3,4-tetrahydronaphthalenedione-1,4 as a bactericide. 5% by weight of 2,3-epoxy-1,2,3,4-tetrahydronaphthalenedione-1,4 was suspended in water which contained 2% of Emulphor EL (believed to be the reaction product of a fatty acid or a fatty acid ester with ethylene oxide) as a dispersing agent. Pieces of diced carrot were immersed in this suspension and allowed to stand at room temperature. No growth of naturally occurring bacteria was observed after thirty days. On the other hand, pieces of diced carrot treated in a similar way with a 2% solution of Emulphor EL in water, which solution did not contain a germicide, became heavily overgrown with naturally occurring bacteria within the same period of time.

*Example V*

In slide tests, similarly to Example III, one part of 2-methyl-2,3-epoxy-1,2,3,4-tetrahydronaphthalenedione-1,4 per million of water completely inhibited spore germination of the fungi *Alternaria solani* and *Sclerotinia americana*.

*Example VI*

Dent corn severely infected with the fungus *Diplodia zeae* were tumbled with .25% by weight of 2-methyl-2,3-epoxy-1,2,3,4-tetrahydronaphthalenedione-1,4 until the surface of the seed was thoroughly covered. The treated seed and also infected seed not treated with the chemical (checks) were planted in ordinary greenhouse compost. Observations on the plants were made at the end of 27 days, and the infection ratings of the plants from treated and untreated (check) seed were arrived at by scoring each plant according to the severity of the lesions formed on the mesocotyl. Disease-free plants were scored as zero and those destroyed by the fungus as 10, with intermediate degrees of infection designated by the appropriate number from 1 to 9. The average score of the plants observed multiplied by 10 gives the percentage infection or the average infection rating. The average infection rating of the plants from the untreated (check) seed was 43% and of the plants from the seed treated with 2-methyl-2,3-epoxy-1,2,3,4-tetrahydronaphthalenedione-1,4 was 17%.

Having thus described my invention, what I claim and desire to protect by Letters Patent is:

1. A fungicidal preparation comprising an aqueous suspension of a 2,3-epoxy-1,2,3,4-tetrahydronaphthalenedione-1,4 containing a dispersing agent.

2. A fungicidal preparation comprising 2,3-epoxy-1,2,3,4-tetrahydronaphthalenedione-1,4 in aqueous suspension containing a dispersing agent.

3. A fungicidal preparation comprising 2-methyl-2,3-epoxy-1,2,3,4-tetrahydronaphthalenedione-1,4 in aqueous suspension containing a dispersing agent.

4. A germicidal preparation comprising a 2,3-epoxy-1,2,3,4-tetrahydronaphthalenedione-1,4 and a carrier therefor selected from the group consisting of powdered solid carriers, and water containing a dispersing agent.

5. The method which comprises treating plants with a 2,3-epoxy-1,2,3,4-tetrahydronaphthalenedione-1,4.

6. The method of protecting organic materials subject to attack by microorganisms which comprises treating said organic material with a 2,3-epoxy-1,2,3,4-tetrahydronaphthalenedione-1,4.

7. The method of protecting organic materials subject to attack by microorganisms which comprises treating said organic material with 2,3-epoxy-1,2,3,4-tetrahydronaphthalenedione-1,4.

8. The method of protecting organic materials subject to attack by microorganisms which comprises treating said organic material with 2-methyl-2,3-epoxy-1,2,3,4-tetrahydronaphthalenedione-1,4.

9. The method of controlling fungi on plants which comprises treating plants with 2,3-epoxy-1,2,3,4-tetrahydronaphthalenedione-1,4.

10. The method of controlling fungi on plants which comprises treating plants with 2-methyl-2,3-epoxy-1,2,3,4-tetrahydronaphthalenedione-1,4.

11. The method of protecting seeds, plants and soil subject to attack by fungi which comprises treating said material with a 2,3-epoxy-1,2,3,4-tetrahydronaphthalenedione-1,4.

12. The method of protecting seed against attack by microorganisms which comprises coating said seed with 2,3-epoxy-1,2,3,4-tetrahydronaphthalenedione-1,4.

13. The method of protecting seed against attack by microorganisms which comprises coating said seed with 2-methyl-2,3-epoxy-1,2,3,4-tetrahydronaphthalenedione-1,4.

14. The method of controlling fungi on living organisms which comprises treating said organisms with 2,3-epoxy-1,2,3,4-tetrahydronaphthalenedione-1,4.

15. The method of controlling fungi on living organisms which comprises treating said organisms with 2-methyl-2,3-epoxy-1,2,3,4-tetrahydronaphthalenedione-1,4.

16. The method of controlling mildew on organic material which comprises treating said organic material with 2,3-epoxy-1,2,3,4-tetrahydronaphthalenedione-1,4.

17. The method of controlling mildew on organic material which comprises treating said organic material with 2-methyl-2,3-epoxy-1,2,3,4-tetrahydronaphthalenedione-1,4.

ELBERT C. LADD.

REFERENCES CITED

The following references are of record in the file of this patent:

UNITED STATES PATENTS

| Number | Name | Date |
|---|---|---|
| 2,348,976 | Hyman | May 16, 1944 |

OTHER REFERENCES

Beilstein—Handbuch der Organische Chemie, 1933 ed. vol. 17, page 510.

Chemical Abstracts, 1934, page 2708, by Madinareitia.